United States Patent
Grandidge (10) Patent No.: US 10,606,012 B1
(45) Date of Patent: Mar. 31, 2020

(54) FIBER OPTIC CASSETTE ASSEMBLY

(71) Applicant: Ortronics, Inc., New London, CT (US)

(72) Inventor: Ryan J. Grandidge, Wakefield, RI (US)

(73) Assignee: Ortronics, Inc., New London, CT (US)

( * ) Notice: Subject to any disclaimer, the term of this patent is extended or adjusted under 35 U.S.C. 154(b) by 0 days.

(21) Appl. No.: 16/213,063

(22) Filed: Dec. 7, 2018

(51) Int. Cl.
*G02B 6/44* (2006.01)

(52) U.S. Cl.
CPC ................ *G02B 6/4453* (2013.01)

(58) Field of Classification Search
None
See application file for complete search history.

(56) References Cited

U.S. PATENT DOCUMENTS

| | | | |
|---|---|---|---|
| 7,697,811 B2 | 4/2010 | Murano et al. | |
| 7,983,038 B2 | 7/2011 | Levesque et al. | |
| 8,106,311 B2 | 1/2012 | Larsen et al. | |
| 8,184,938 B2 | 5/2012 | Cooke et al. | |
| 8,398,039 B2 | 3/2013 | Murano et al. | |
| 8,439,702 B2 | 5/2013 | Dietz et al. | |
| 8,672,709 B2 | 3/2014 | Dietz et al. | |
| 8,731,364 B2 | 5/2014 | Murano et al. | |
| 8,758,047 B2 | 6/2014 | Dietz et al. | |
| 9,606,317 B2 | 3/2017 | Grandidge et al. | |
| 2012/0171888 A1* | 7/2012 | Dietz | H01R 13/6395 439/345 |
| 2014/0037259 A1* | 2/2014 | Bragg | H01R 13/659 385/135 |
| 2016/0116685 A1* | 4/2016 | Wong | G02B 6/3825 385/56 |
| 2016/0306125 A1* | 10/2016 | Wu | G02B 6/3893 |

* cited by examiner

*Primary Examiner* — Chad H Smith
(74) *Attorney, Agent, or Firm* — McCarter & English, LLP (57) ABSTRACT

The present disclosure provides improved fiber optic connector assemblies (e.g., high density fiber optic cassette assemblies) for use in communication systems, and improved methods for using the same. More particularly, the present disclosure provides advantageous systems/methods for the design and use of media patching systems having fiber optic connector assemblies that include a sliding securement member. The fiber optic connector assemblies are easily secured and/or unsecured to or from a media system (e.g., to or from a panel member of a media system). The present disclosure provides for improved systems and methods for easily securing and/or unsecuring fiber optic connector assemblies to or from a panel member or the like by utilizing advantageous connector assemblies that include a sliding securement member, and related assemblies.

18 Claims, 11 Drawing Sheets

FIBER OPTIC CASSETTE ASSEMBLY

FIELD OF THE DISCLOSURE

The present disclosure relates to fiber optic connector assemblies (e.g., high density fiber optic cassette assemblies) for use in communication systems and, more particularly, to media patching systems having fiber optic connector assemblies having a sliding securement member.

BACKGROUND OF THE DISCLOSURE

In general, devices for interfacing with high frequency data transfer media are known. See, e.g., U.S. Pat. Nos. 8,439,702; 8,672,709; 8,731,364 and 9,606,317, the entire contents of each being hereby incorporated by reference in their entireties.

Commercial buildings typically require an effective and efficient telecommunications infrastructure to support the wide variety of services that rely on the transport of information. Wiring systems within buildings are terminated at a location where they may be interconnected with one another, and/or to other cabling systems or telecommunications equipment. Cables are often terminated on wire panels or patch panels or the like, which can be mounted to racks or to some other location/structure.

In general, patch panels are known in the field of data communication systems. See, e.g., U.S. Pat. No. 8,106,311, the entire contents of which is hereby incorporated by reference in its entirety. Some other exemplary assemblies/systems in this general field are described and disclosed in U.S. Pat. Nos. 7,697,811; 7,983,038; 8,184,938; 8,398,039 and 8,758,047, the entire contents of each being hereby incorporated by reference in their entireties.

Patch panels can be mounted hardware units that include a plurality of port locations, and utilize cables for interconnections. A patch panel can use patch cords to create the interconnections. Patch panel systems are generally intended to facilitate organization and management in implementing telecommunications wiring systems (e.g., for high speed data networks). A patch panel generally provides a plurality of network ports incorporated into a structural element that connect incoming and outgoing lines of a communication/electrical system (e.g., a local area network (LAN) or the like).

Many rows of cabinets or racks typically fill a data center or telecommunications room. Patch panels affixed to a rack and/or a telecommunications room provide convenient access to telecommunication devices (e.g., servers) within the rack or room. As the demand for the use of telecommunication devices rapidly grows, space for such devices becomes limited and/or expensive.

A constant need exists among manufacturers to develop connector assemblies (e.g., fiber optic cassette assemblies) for use in communication systems or the like that include improved features and structures.

Thus, an interest exists for improved connector assemblies that are easily secured and/or unsecured to or from a media system (e.g., to or from a panel member), and related methods of use. These and other inefficiencies and opportunities for improvement are addressed and/or overcome by the assemblies, systems and methods of the present disclosure.

SUMMARY OF THE DISCLOSURE

The present disclosure provides advantageous fiber optic connector assemblies (e.g., high density fiber optic cassette assemblies) for use in communication systems, and improved methods for using the same.

More particularly, the present disclosure provides improved systems/methods for the design and use of media patching systems having fiber optic connector assemblies that include a sliding securement member. The present disclosure provides for improved systems/designs for fiber optic connector assemblies that are easily secured and/or unsecured to or from a media system (e.g., to or from a panel member of a media system).

In exemplary embodiments, the present disclosure provides for improved systems and methods for easily securing and/or unsecuring fiber optic connector assemblies to or from a panel member or the like by utilizing advantageous connector assemblies that include a sliding securement member, and related assemblies.

The present disclosure provides for a fiber optic connector assembly including a housing that extends from a first end to a second end, the housing including a front wall proximal to the first end and a first top wall section that extends from a position proximal to the front wall of the housing to a second top wall section, the second top wall section including a recess; a sliding securement member releasably secured to the first top wall section of the housing, the sliding securement member extending from a first end to a second; wherein the sliding securement member is configured to be moved away from the front wall of the housing to a rearward position to allow the housing to be moved to a first position within an aperture of a panel member; wherein the sliding securement member is configured to be moved toward the front wall of the housing to a forward position to removably lock the housing within the aperture after the housing has moved to a second position within the aperture; and wherein at least a portion of the second end of the sliding securement member is positioned over and above the recess of the second top wall section when the sliding securement member is in the rearward or the forward positions.

The present disclosure also provides for a fiber optic connector assembly wherein the first end of the housing houses at least a portion of one or more fiber optic ports for mating with fiber optic connectors. The present disclosure also provides for a fiber optic connector assembly wherein the first end of the housing houses at least a portion of a first connector member and houses at least a portion of a second connector member, the first and second connector members each including one or more fiber optic ports for mating with fiber optic connectors; and wherein the second connector member is stacked above the first connector member so that the second connector member is positioned closer to the first top wall section of the housing than the first connector member.

The present disclosure also provides for a fiber optic connector assembly wherein the first and second connector members each include four fiber optic ports for mating with fiber optic connectors. The present disclosure also provides for a fiber optic connector assembly wherein the first end of the housing houses at least a portion of a third connector member, the third connector member including one or more fiber optic ports for mating with fiber optic connectors; and wherein the third connector member is stacked above the second connector member so that the third connector member is positioned closer to the first top wall section of the housing than the second connector member.

The present disclosure also provides for a fiber optic connector assembly wherein the second top wall section extends from the first top wall section to the second end of the housing, the second top wall section sloping downward from a position proximal to the first top wall section to the second end of the housing.

The present disclosure also provides for a fiber optic connector assembly wherein the recess is defined by an abutment wall, a first perimeter wall, a second perimeter wall, and a base wall; and wherein the abutment wall extends from a position proximal to the first top wall section downwards and away from the second top wall section. The present disclosure also provides for a fiber optic connector assembly wherein the base wall orthogonally extends from the abutment wall to a position along the second top wall section that is a distance away from the second end of the housing, and the first and second perimeter walls orthogonally extend from the abutment wall and from the base wall to define the recess.

The present disclosure also provides for a fiber optic connector assembly wherein the housing further includes a first rear side wall and a second rear side wall, and the sliding securement member includes a forward securement section that extends from a first side to a second side; and wherein after the sliding securement member is releasably secured to the first top wall section of the housing, the first side of the forward securement section is positioned a distance away from the first rear side wall of the housing, and the second side of the forward securement section is positioned a distance away from the second rear side wall of the housing.

The present disclosure also provides for a fiber optic connector assembly wherein the panel member is a patch panel member or a multi-connector panel member; and wherein the panel member is configured to be mounted with respect to a media patching system, and the media patching system is configured to be mounted with respect to a supporting structure.

The present disclosure also provides for a fiber optic connector assembly wherein the first top wall section and the second top wall section are releasably secured to the housing; and wherein the housing includes a rear MPO plug.

The present disclosure also provides for a fiber optic connector assembly wherein the sliding securement member includes a tab member; and wherein when the sliding securement member is moved toward the front wall to the forward position, the tab member takes up tolerance against a top wall of the panel member to removably lock the housing to the panel member.

The present disclosure also provides for a fiber optic connector assembly wherein the recess is centrally positioned on the second top wall section, and the recess extends from a position proximal to the first top wall section to a position along the second top wall section that is a distance away from the second end of the housing.

The present disclosure also provides for a fiber optic connector assembly wherein the first top wall section includes a first rail member and a second rail member, and the sliding securement member includes a first extension and a second extension; and wherein the sliding securement member is releasably secured to the first top wall section of the housing by: (i) inserting the first extension of the sliding securement member into the first rail member, and (ii) inserting the second extension of the sliding securement member into the second rail member.

The present disclosure also provides for a fiber optic connector assembly wherein the front wall further includes a first extension that extends from the front wall and the panel member further includes a first flange, the first extension configured and dimensioned to bypass the first flange when the housing is moved to the first position; and wherein the first extension is lockingly engaged with the first flange when the housing is in the second position.

The present disclosure also provides for a fiber optic connector assembly including a housing that extends from a first end to a second end, the housing including a front wall proximal to the first end and a first top wall section; a sliding securement member releasably secured to the first top wall section of the housing; wherein the first end of the housing houses at least a portion of a first connector member and houses at least a portion of a second connector member, the first and second connector members each including two or more fiber optic ports for mating with fiber optic connectors; and wherein the second connector member is stacked above the first connector member so that the second connector member is positioned closer to the first top wall section of the housing than the first connector member; wherein the sliding securement member is configured to be moved away from the front wall of the housing to a rearward position to allow the housing to be moved to a first position within an aperture of a panel member; and wherein the sliding securement member is configured to be moved toward the front wall of the housing to a forward position to removably lock the housing within the aperture after the housing has moved to a second position within the aperture.

The present disclosure also provides for a fiber optic connector assembly wherein the first end of the housing houses at least a portion of a third connector member, the third connector member including two or more fiber optic ports for mating with fiber optic connectors; and wherein the third connector member is stacked above the second connector member so that the third connector member is positioned closer to the first top wall section of the housing than the second connector member.

The present disclosure also provides for a fiber optic connector assembly wherein the first connector member is a LC quad connector member that is positioned proximal to a bottom side of the housing; and wherein the second connector member is a LC quad connector member; and wherein the third connector member is a LC quad connector member that is positioned proximal to the first top wall section of the housing, with the second connector member positioned between the first and third connector members.

The present disclosure also provides for a fiber optic connector assembly wherein the first top wall section extends from a position proximal to the front wall of the housing to a second top wall section, the second top wall section including a recess; wherein the sliding securement member extends from a first end to a second; and wherein at least a portion of the second end of the sliding securement member is positioned over and above the recess of the second top wall section when the sliding securement member is in the rearward position.

The present disclosure also provides for a fiber optic connector assembly including a housing that extends from a first end to a second end, the housing including a front wall proximal to the first end and a first top wall section that extends from a position proximal to the front wall of the housing to a second top wall section, the second top wall section including a recess; a sliding securement member releasably secured to the first top wall section of the housing, the sliding securement member extending from a first end to a second; wherein the first end of the housing houses at least a portion of a first connector member and houses at least a portion of a second connector member and houses at least a portion of a third connector member, the first, second and third connector members each including two or more fiber optic ports for mating with fiber optic connectors; wherein the second connector member is stacked above the first connector member so that the second connector member is positioned closer to the first top wall section of the housing than the first connector member; wherein the third connector member is stacked above the second connector member so that the third connector member is positioned closer to the first top wall section of the housing than the second connector member, with the second connector member positioned between the first and third connector members; wherein the second top wall section extends from the first top wall section to the second end of the housing, the second top wall section sloping downward from a position proximal to the first top wall section to the second end of the housing; wherein the recess is defined by an abutment wall, a first perimeter wall, a second perimeter wall, and a base wall; wherein the sliding securement member is configured to be moved away from the front wall of the housing to a rearward position to allow the housing to be moved to a first position within an aperture of a panel member; wherein the sliding securement member is configured to be moved toward the front wall of the housing to a forward position to removably lock the housing within the aperture after the housing has moved to a second position within the aperture; and wherein at least a portion of the second end of the sliding securement member is positioned over and above the recess of the second top wall section when the sliding securement member is in the rearward or the forward positions.

Any combination or permutation of embodiments is envisioned. Additional advantageous features, functions and applications of the disclosed assemblies, systems and methods of the present disclosure will be apparent from the description which follows, particularly when read in conjunction with the appended figures. All references listed in this disclosure are hereby incorporated by reference in their entireties.

BRIEF DESCRIPTION OF THE DRAWINGS

Features and aspects of embodiments are described below with reference to the accompanying drawings, in which elements are not necessarily depicted to scale.

Exemplary embodiments of the present disclosure are further described with reference to the appended figures. It is to be noted that the various features, steps and combinations of features/steps described below and illustrated in the figures can be arranged and organized differently to result in embodiments which are still within the scope of the present disclosure. To assist those of ordinary skill in the art in making and using the disclosed assemblies, systems and methods, reference is made to the appended figures, wherein.

DETAILED DESCRIPTION OF DISCLOSURE

The exemplary embodiments disclosed herein are illustrative of advantageous fiber optic connector assemblies of the present disclosure and methods/techniques thereof. It should be understood, however, that the disclosed embodiments are merely exemplary of the present disclosure, which may be embodied in various forms. Therefore, details disclosed herein with reference to exemplary patching systems/fabrication methods and associated processes/techniques of assembly and use are not to be interpreted as limiting, but merely as the basis for teaching one skilled in the art how to make and use the advantageous fiber optic connector assemblies and/or alternative assemblies of the present disclosure.

The present disclosure provides improved fiber optic connector assemblies (e.g., high density fiber optic cassette assemblies) for use in communication systems, and improved methods for using the same.

In general, the present disclosure provides improved systems/methods for the design and use of fiber optic connector assemblies that include a sliding securement member. Disclosed herein are improved systems and methods for easily securing and/or unsecuring fiber optic connector assemblies to or from a panel member or the like by utilizing advantageous connector assemblies that include a sliding securement member. More particularly and in exemplary embodiments, the present disclosure provides for improved systems/designs for connector assemblies that are easily secured and/or unsecured to or from a panel member of a media system, thereby providing a significant operational, commercial and/or manufacturing advantage as a result.

Referring now to the drawings, like parts are marked throughout the specification and drawings with the same reference numerals, respectively. Drawing figures are not necessarily to scale and in certain views, parts may have been exaggerated for purposes of clarity.

With reference to FIGS. 1 and 8-11, there is illustrated an exemplary panel member 12 of a media patching system 100 according to the present disclosure.

One or more panel members 12 (e.g., patch panel members/multi-connector panel members 12) can be utilized with (e.g., mounted to) system 100 to support multiple media connections. As described and disclosed in U.S. Pat. No. 9,606,317, system 100 may or may not include top covers, a lower cable management plate, bracket members, and a door assembly. System 100 can be configured to be mounted with respect to a supporting structure (e.g., a rack) or the like. It is noted that exemplary media patching systems 100 can be adapted for use in conjunction with a rack (e.g., network or server rack) or the like, although the present disclosure is not limited thereto. Rather, the disclosed media patching systems 100 can be adapted for use in conjunction with other structures, such as, for example, frames, cabinets, supporting structures, or other structures that stand to benefit from proximate cable management functionality. For ease of disclosure, the potential structures to which the disclosed systems 100 may be mounted are collectively referred to as "racks." However, it is to be understood that the present disclosure is not limited by or to implementations wherein the disclosed systems 100 are mounted with respect to, or used in conjunction with, a rack, but may be mounted with respect to, or used in conjunction with other structures/units (e.g., structures/units associated with cable routing).

Figure 1:
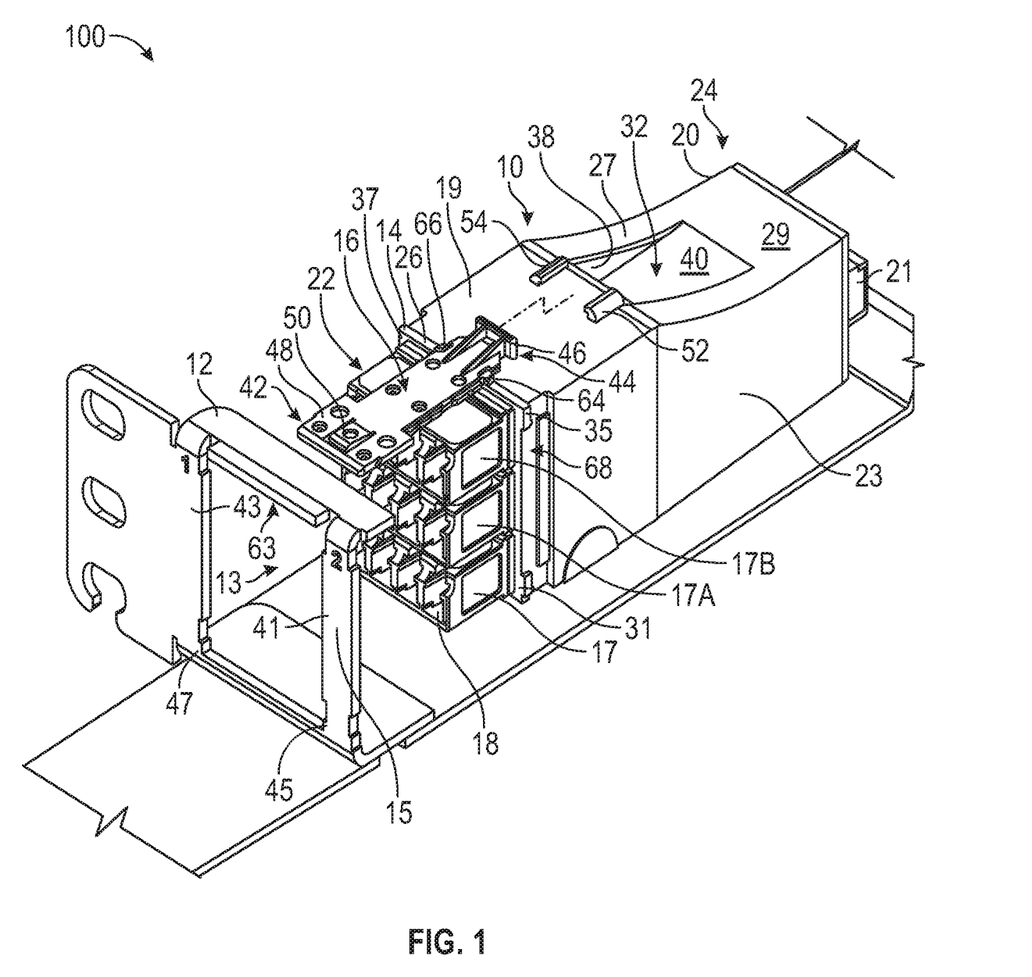
FIG. 1 is a top perspective view of an exemplary fiber optic connector assembly and partial view of a panel member according to the present disclosure.
Figure 9:
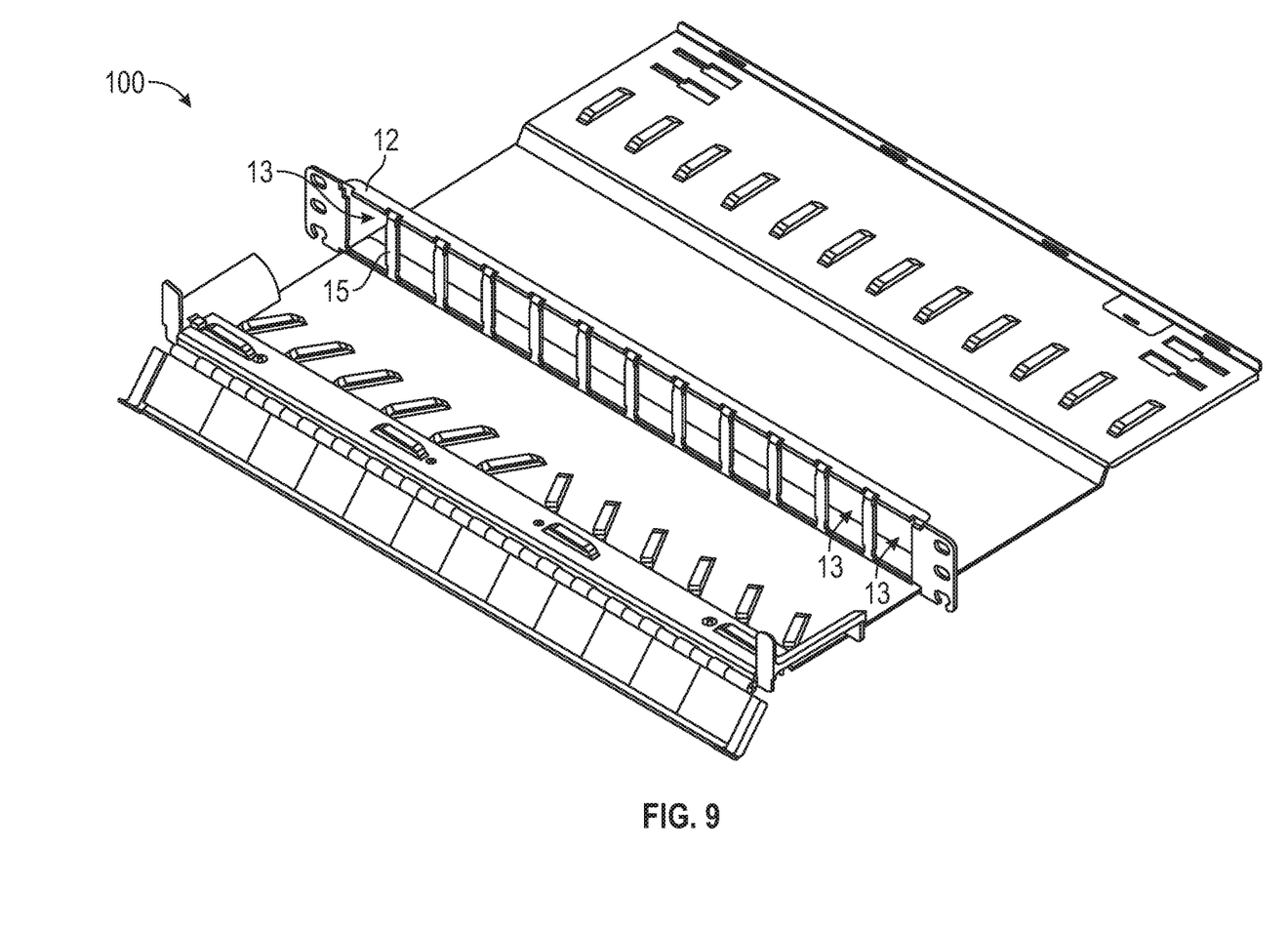
FIG. 9 is a top perspective view of an exemplary panel member of a media patching system.

As noted, panel members 12 can be utilized with system 100 to support multiple media connections. As shown in FIGS. 1 and 9, exemplary panel member 12 has a front panel surface/segment 15 that includes a plurality of apertures 13 therethrough. As discussed in further detail below, each aperture 13 is typically configured and dimensioned to have a connector assembly 10 mounted with respect thereto. It is noted that panel member 12 can take a variety of shapes, forms and/or geometries, and can include any suitable number of apertures 13.

Figure 10:
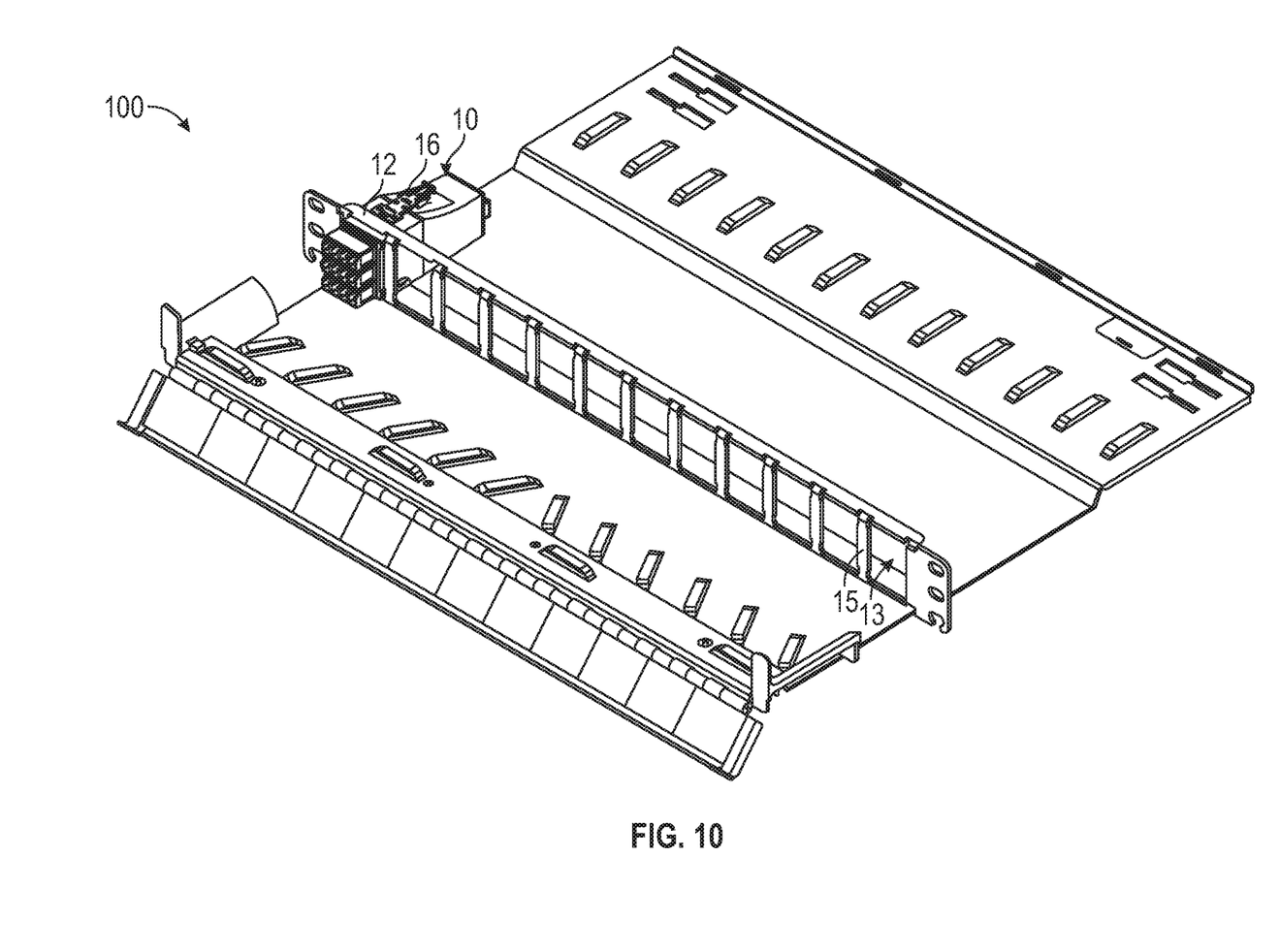
FIG. 10 is a top perspective view of the panel member of FIG. 9, with an exemplary connector assembly positioned therethrough and with the sliding securement member in a rear position.
Figure 11:
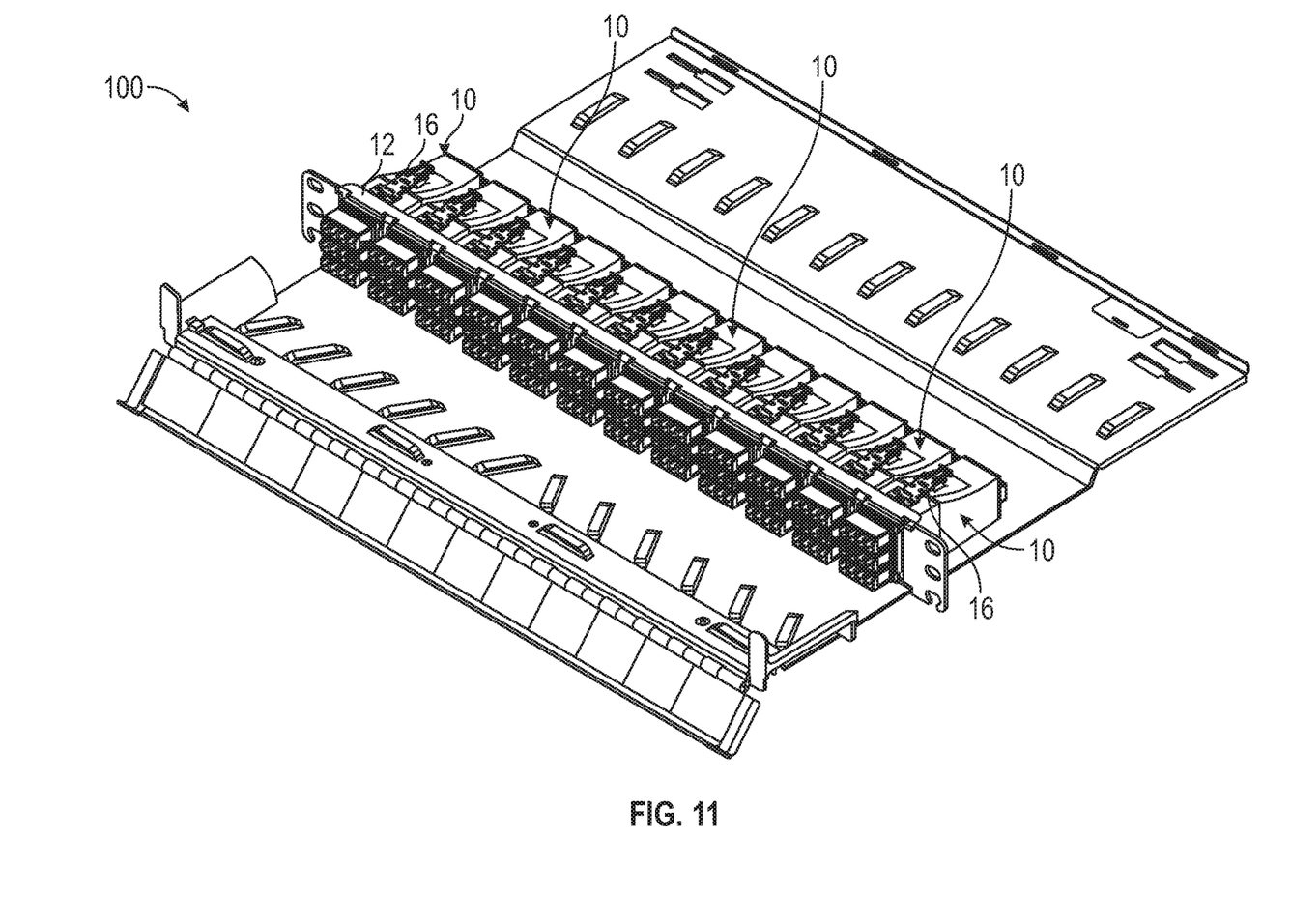
FIG. 11 is a top perspective view of the panel member of FIG. 9, with exemplary connector assemblies mounted thereto and with the sliding securement members in forward positions.

In certain embodiments and as shown in FIGS. 9-11, exemplary panel member 12 includes twelve apertures 13, with each aperture 13 configured and dimensioned to have a connector assembly 10 mounted with respect thereto.

As such, one or more connector assemblies 10 can be mounted with respect to panel member 12 (e.g., with one aperture 13 configured to house/mount to one assembly 10). More particularly, each connector assembly 10 typically includes a sliding securement member 16 (FIGS. 1-8 and 10-11) that is configured to releasably secure the connector assembly 10 to panel member 12. It is noted that panel member 12 can include any number/combination of connector assemblies 10 mounted thereon (e.g., one, two, three, four, six, twelve, a plurality, etc.).

As shown in FIGS. 1-8, exemplary fiber optic connector assembly 10 takes the form of a high density fiber optic cassette assembly 10 having a plurality of fiber optic ports 18 (e.g., twelve ports 18) for mating with fiber optic connectors. It is noted that connector assembly 10 can include any suitable number of fiber optic ports 18.

In certain embodiments, connector assembly 10 is a twelve fiber front load connector assembly 10, and includes three stacked connector members 17 (e.g., three stacked LC quad connector members 17) for the twelve ports 18.

For example and as shown in FIGS. 1-8, connector assembly 10 includes a first connector member 17 (e.g., LC quad connector member 17) positioned proximal to bottom side 11 of housing 14, and includes a second connector member 17A (e.g., LC quad connector member 17A) positioned above the first connector member 17, and includes a third connector member 17B (e.g., LC quad connector member 17B) positioned above the second connector member 17A and positioned proximal to the first top wall section 19 of cover member 20, with the second connector member 17A positioned between the first and third connector members 17, 17B.

Exemplary first connector member 17 includes four ports 18, and exemplary second connector member 17A includes four ports 18, and exemplary third connector member 17B includes four ports 18, although the present disclosure is not limited thereto. Rather, it is noted that connector members 17, 17A and/or 17B can include other suitable numbers of ports 18 (e.g., one, two, three, six, a plurality, etc.).

It is also noted that connector assembly 10 can include other combinations/permutations of connector members 17 (e.g., only a first connector member 17 associated with housing 14; or a first connector member 17 with a second connector member 17A stacked thereon for a total of two connector members 17, 17A; or a fourth connector member 17C stacked on top of the third connector member 17B of FIG. 1 for a total of four connector members 17-17C; etc.).

As shown in FIGS. 1-8, connector assembly 10 can be a cassette assembly 10 that includes housing 14, a cover member 20, a rear multi-fiber push on ("MPO") plug 21, and an internal breakout harness within housing 14.

In exemplary embodiments and as shown in FIGS. 1-8, connector assembly 10 includes housing 14 that extends from a first end 22 to a second end 24, and includes a front wall 26. In general, the front wall 26 of first end 22 of housing 14 is configured to house at least a portion of the ports 18 and/or connector members 17.

Figure 2:
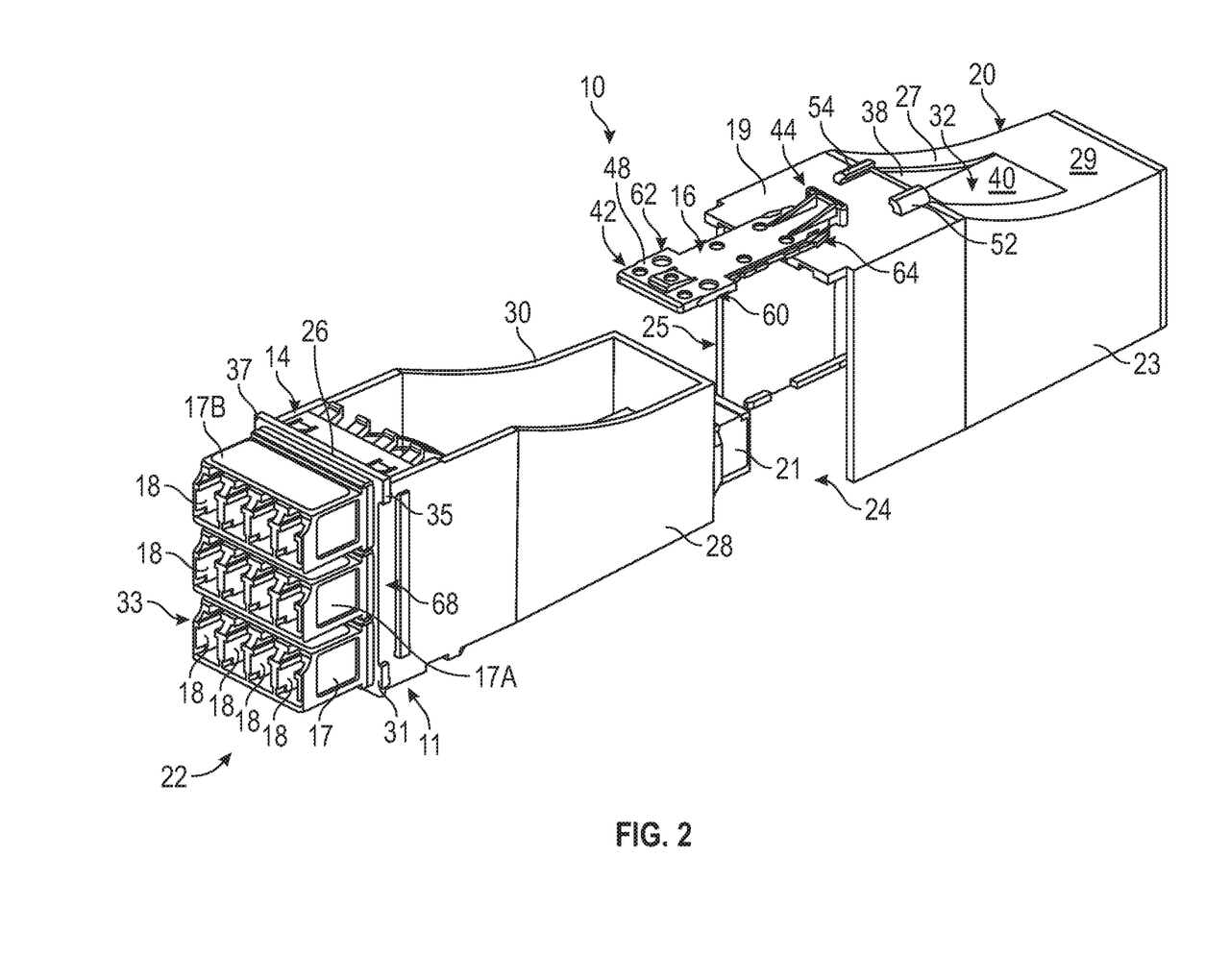
FIG. 2 is an exploded side perspective view of the assembly of FIG. 1.
Figure 3:
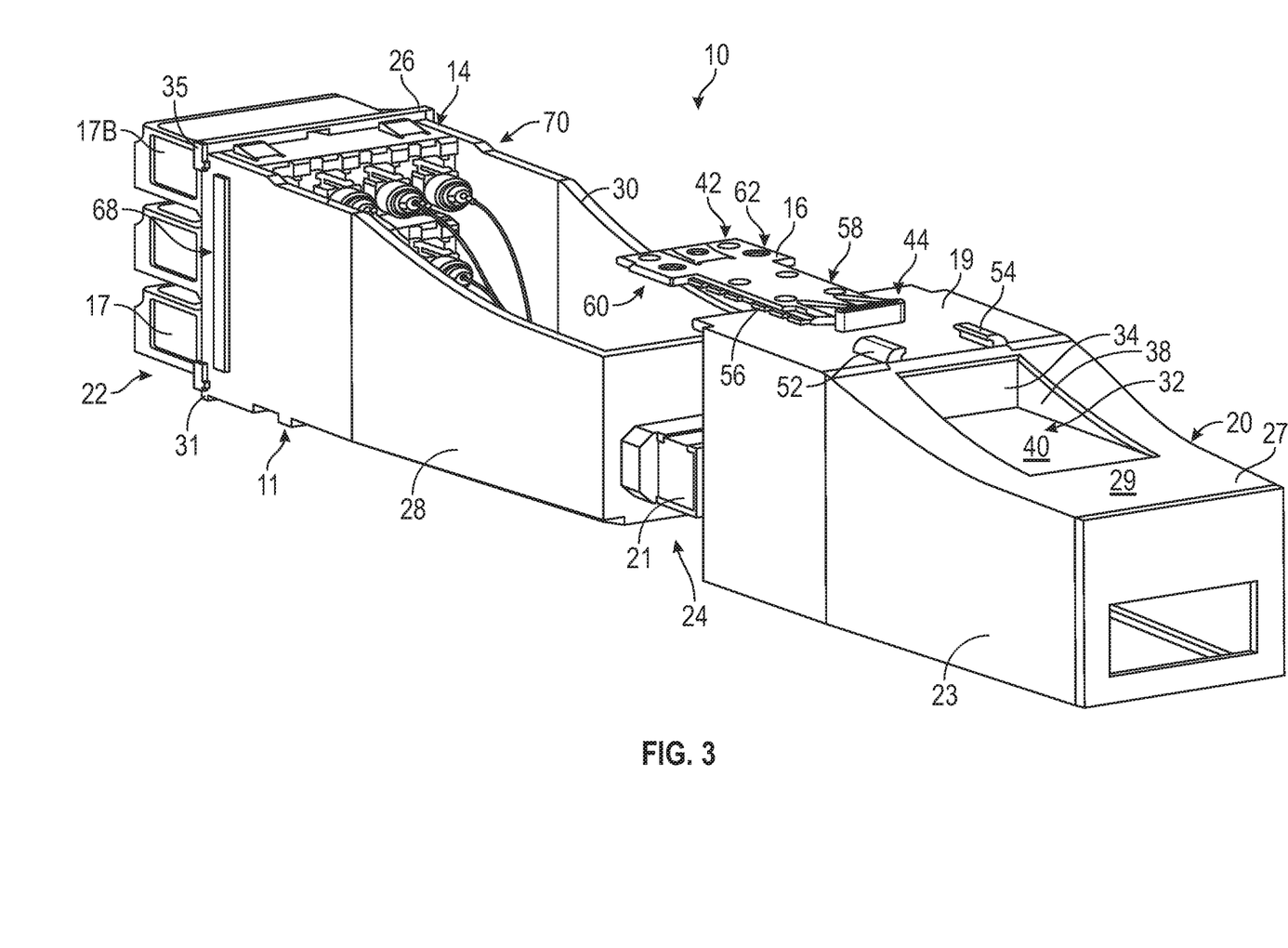
FIG. 3 is an exploded rear perspective view of the assembly of FIG. 1.

As shown in FIGS. 2-3, exemplary housing 14 includes a first rear side wall 28 that extends from the front wall 26 to the second end 24, and includes a second rear side wall 30 that extends from the front wall 26 to the second end 24.

Housing 14 also can include a cover member 20 that extends from the front wall 26 to the second end 24 (after mounting cover member 20 to housing 14), the cover member 20 including first top wall section 19 and second top wall section 27.

Cover member 20 may also include first outer side wall 23 and second outer side wall 25. In general, when cover member 20 is mounted to housing 14, first outer side wall 23 covers at least a portion of first rear side wall 28, and second outer side wall 25 covers at least a portion of second rear side wall 30. It is noted that cover member 20 may or may not be removable from housing 14. It is also noted that housing 14 and cover member 20 may be a one-piece unit or member (e.g., integrally formed). In other embodiments and as shown in FIGS. 1-8, cover member 20 may be separately fabricated and then secured, attached or mounted with respect to housing 14.

In exemplary embodiments and after mounting cover member 20 to housing 14, the first top wall section 19 extends from a position proximal to the front wall 26 of the housing to the second top wall section 27. In certain embodiments, first top wall section 19 is substantially flat and planar.

Second top wall section 27 extends from the first top wall section 19 to the second end 24. Exemplary second top wall section 27 slopes downward from a position proximal to the first top wall section 19 to the second end 24 (e.g., via sloping surface 29 of second top wall section 27).

In certain embodiments, second top wall section 27 also includes recess or cavity 32 (e.g., central recess/cavity 32). Exemplary recess 32 is centrally positioned on second top wall section 27, and extends from a position proximal to the first top wall section 19 to a position along second top wall section 27 that is a distance away from second end 24. In other embodiments, it is noted that recess 32 can extend from a position proximal to the first top wall section 19 to a position proximal to second end 24.

Figure 7:
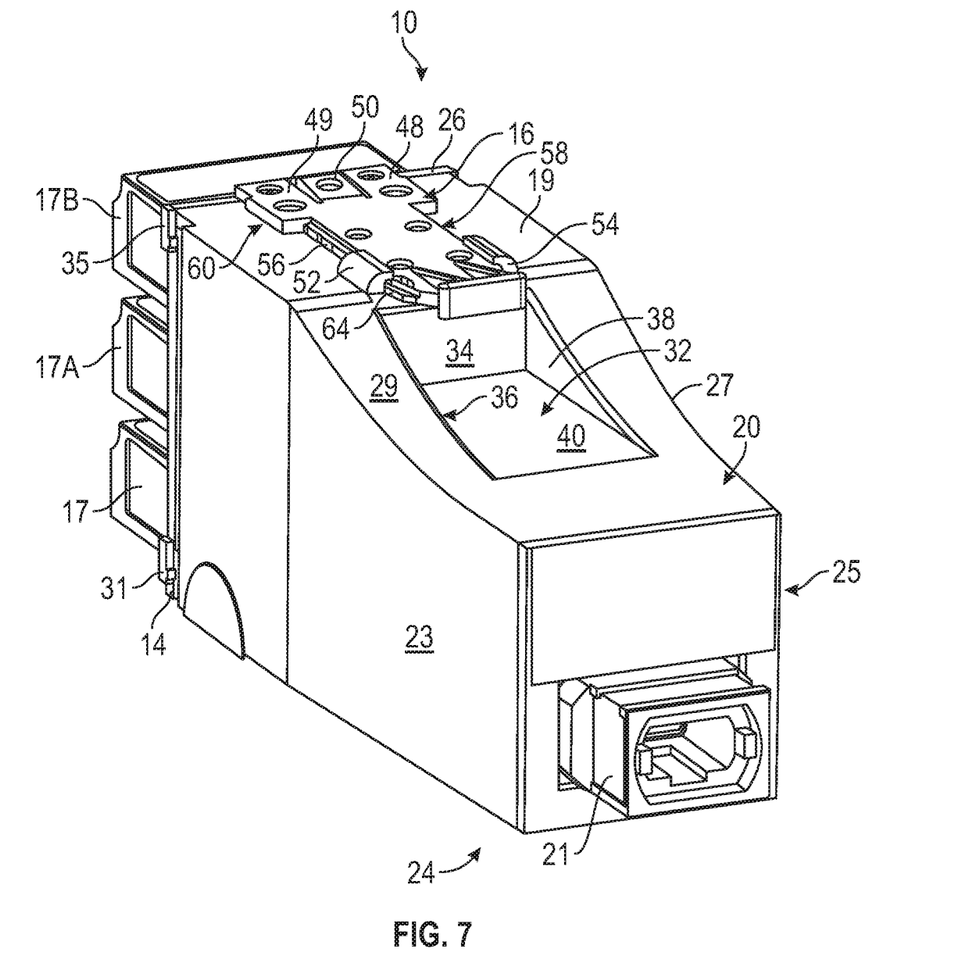
FIG. 7 is a rear view of the assembly of FIG. 1, with the sliding securement member in a forward position.

Exemplary recess 32 is defined by abutment wall 34, first perimeter wall 36, second perimeter wall 38, and base wall 40. In certain embodiments, abutment wall 34 extends from a position proximal to the first top wall section 19 downwards and away from sloping surface 29. Exemplary base wall 40 extends (e.g., orthogonally extends) from abutment wall 34 to a position along second top wall section 27 that is a distance away from second end 24 (or to position proximal to second end 24). First and second perimeter walls 36, 38 extend (e.g., orthogonally extend) from abutment wall 34 and from base wall 40 to define recess 32 (FIG. 7).

As noted, connector assembly 10 includes releasable sliding securement member 16. As shown in FIGS. 1-8, exemplary sliding securement member 16 extends from a first end 42 to a second end 44. The second end 44 of sliding securement member 16 can include a handle member 46.

Exemplary sliding securement member 16 is an elongated member that is configured and dimensioned to be releasably secured or attached to housing 14 (e.g., to cover member 20 of housing 14). Sliding securement member 16 can include forward securement section 48, as discussed further below. Exemplary forward securement section 48 includes a top surface 49 having a tab member 50 or the like. Forward securement section extends from a first side 60 to a second side 62.

In exemplary embodiments, first top wall section 19 of cover member 20 includes rail members 52, 54 that are configured and dimensioned to allow sliding securement member 16 to be releasably secured or attached to the first top wall section 19 of cover member 20. Exemplary rail members 52, 54 allow sliding securement member 16 to slide or move along a portion of first top wall section 19, with extensions 56, 58 of sliding securement member 16 traveling or sliding underneath at least a portion of rail members 52, 54. As such, sliding securement member 16 is inserted or secured to first top wall section 19 by sliding the second end 44 of sliding securement member 16 from the front wall 26 and along the first top wall section 19 until the extensions 56, 58 are positioned at least in part underneath rail members 52, 54. Once sliding securement member 16 is so positioned (FIG. 5), rail members 52, 54 releasably secure sliding securement member 16 to first top wall section 19, and also allow sliding securement member 16 to travel along the first top wall section 19, with the extensions 56, 58 moving or sliding underneath rail members 52, 54. In exemplary embodiments, forward securement section 48 of sliding securement member 16 prevents sliding securement member 16 from further moving toward the second end 24 when the forward securement section 48 engages rail members 52, 54 (FIG. 4).

Figure 4:
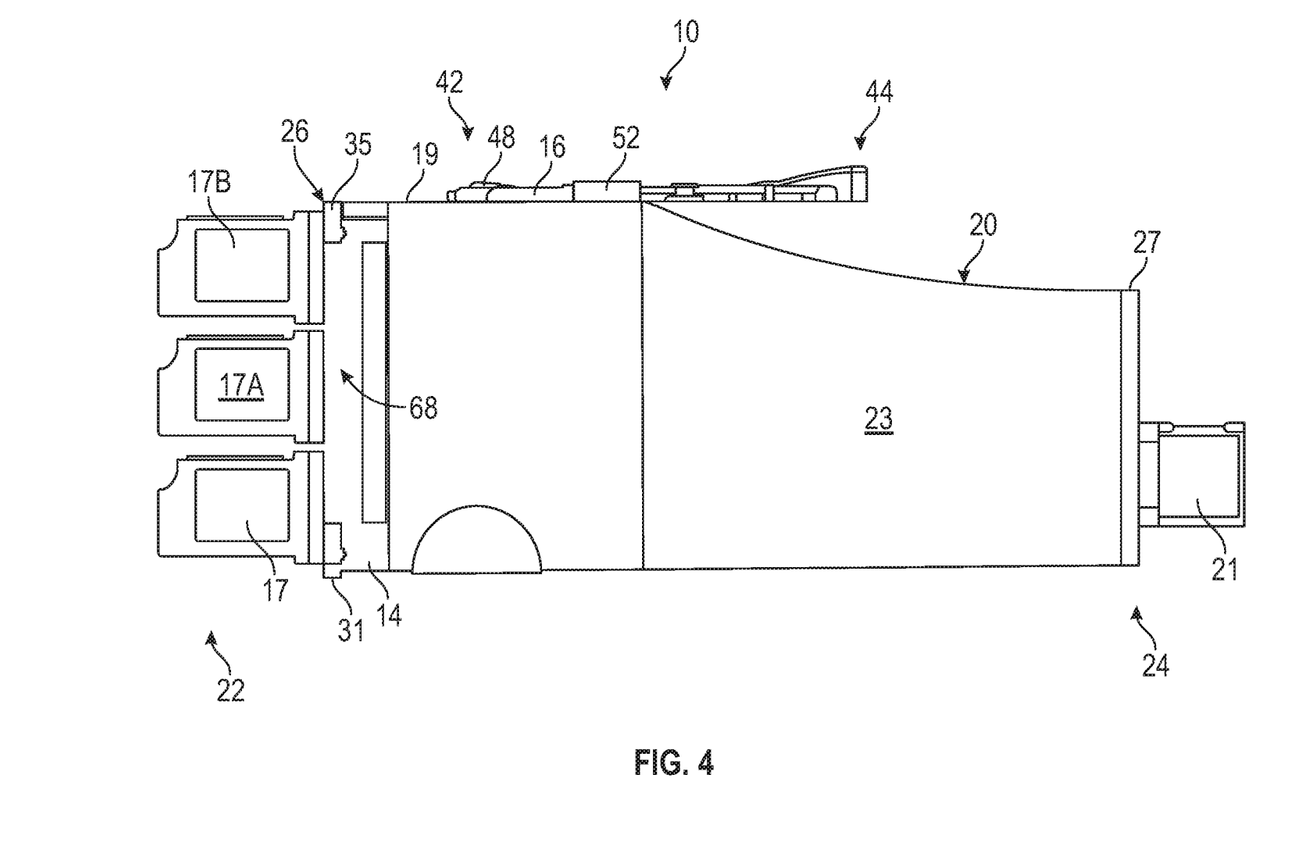
FIG. 4 is a side view of the assembly of FIG. 1, with the sliding securement member in a rear position.
Figure 5:
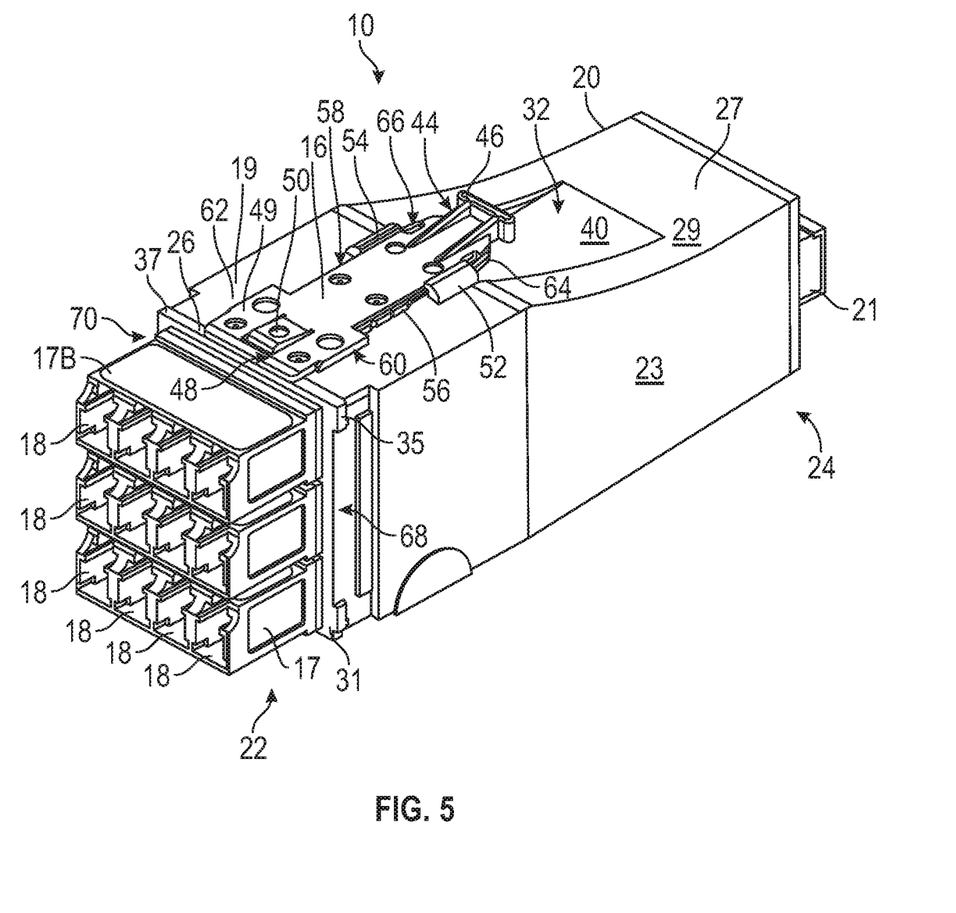
FIG. 5 is a side perspective view of the assembly of FIG. 1, with the sliding securement member in a forward position.
Figure 6:
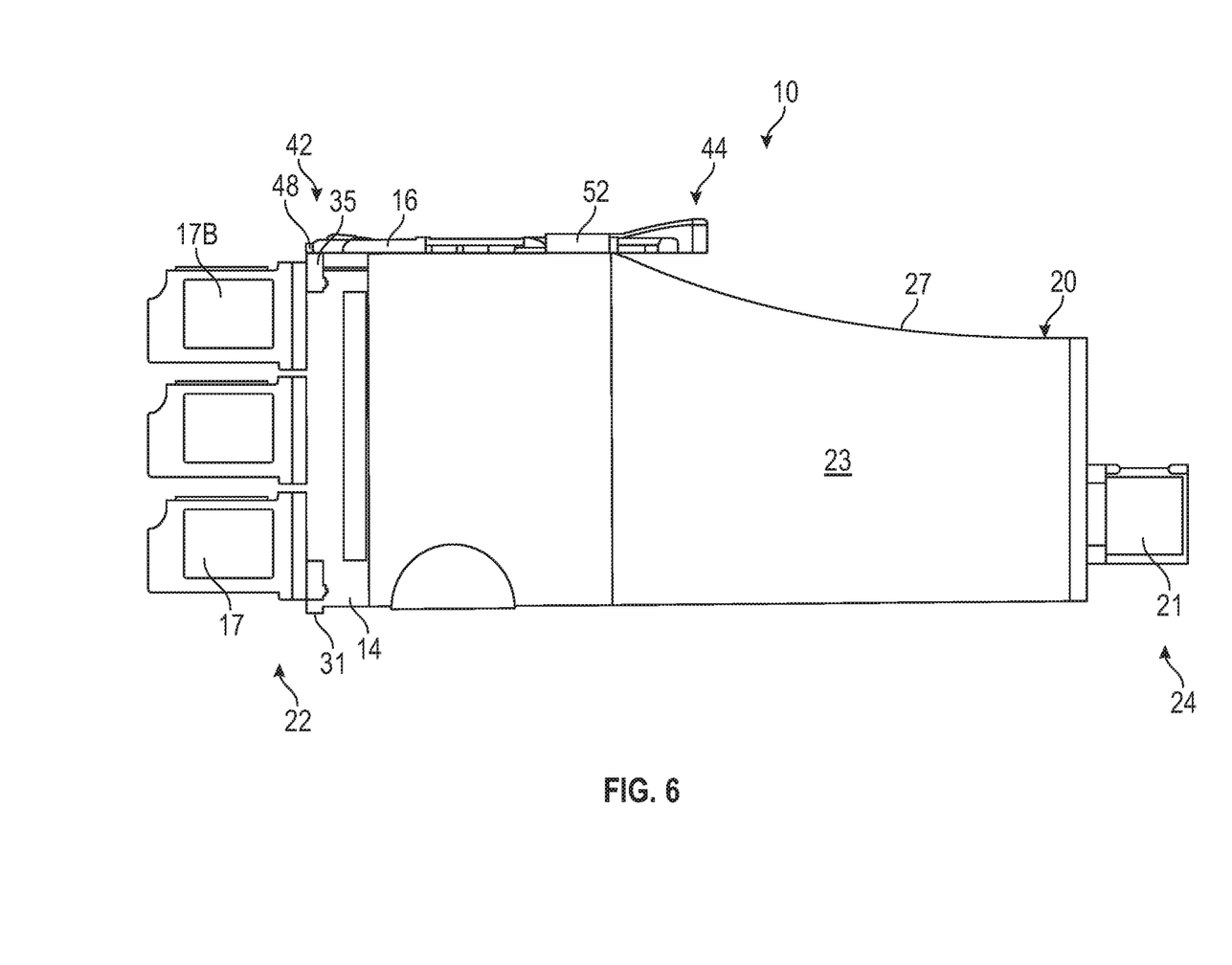
FIG. 6 is a side view of the assembly of FIG. 1, with the sliding securement member in a forward position.

In certain embodiments and as shown in FIGS. 4-5, after the sliding securement member 16 is releasably secured or attached to the first top wall section 19 with portions of extensions 56, 58 positioned underneath rail members 52, 54, the first side 60 of forward securement section 48 is positioned a distance away from first rear side wall 28 and first outer side wall 23, and the second side 62 of forward securement section 48 is positioned a distance away from second rear side wall 30 and second outer side wall 25.

Stated another way, after the sliding securement member 16 is releasably secured or attached to the first top wall section 19 with portions of extensions 56, 58 positioned underneath rail members 52, 54, the forward securement section 48 does not extend from the first rear side wall 28 to the second rear side wall 30 across first top wall section 19, and the forward securement section 48 does not extend from the first outer side wall 23 to the second outer side wall 25 across first top wall section 19.

Moreover, after the sliding securement member 16 is releasably secured or attached to the first top wall section 19 with portions of extensions 56, 58 positioned underneath rail members 52, 54, the second end 44 of sliding securement member 16 is positioned a distance away from second end 24 of housing 14, and at least a portion of the second end 44 of the sliding securement member 16 is positioned over cavity 32 and positioned above second top wall section 27.

Stated another way, after the sliding securement member 16 is releasably secured or attached to the first top wall section 19 with portions of extensions 56, 58 positioned underneath rail members 52, 54, the second end 44 of sliding securement member 16 does not extend from the first top wall section 19 to the second end 24 of the housing, with at least a portion of the second end 44 of the sliding securement member 16 is positioned over cavity 32 and positioned above second top wall section 27.

The second end 44 of the sliding securement member 16 can include tabs 64, 66. A width of the sliding securement member 16 can be reduced around the tabs 64, 66 to accommodate the tabs 64, 66 in a decompressed position and a compressed position. In the decompressed position, the tabs 64, 66 protrude outward beyond the respective edges of the extensions 56, 58. In a compressed position, the tabs 64, 66 can be deflected inwardly towards each other and can be generally flush with or recessed with respect to the edges of the extensions 64, 66.

The sliding securement member 16 can be inserted or secured to first top wall section 19 by sliding the second end 44 from the front wall 26 and along the first top wall section 19. As the sliding securement member 16 slides along the first top wall section 19, the tabs 64, 66 press against a distal edge of the rail members 52, 54. The rail members 52, 54 can urge, compress, depress, or deflect the tabs 64, 66 inward towards each other so that the tabs 64, 66 fit through the rail members 52, 54. For example, the tabs 64, 66 can be urged, deflected, depressed, or compressed inward so that the tabs 64, 66 are substantially flush or recessed with respect to the extensions 56, 58. Once tabs 64, 66 have slide past the rail members 52, 54, the extensions 56, 58 are positioned at least in part underneath rail members 52, 54 and the tabs 64, 66 can return to their decompressed position so that the tabs 64, 66 can then extend outward beyond the edges of the extensions 56, 58, thereby releasably attaching the sliding securement member 16 to the first top wall section 19. Once sliding securement member 19 is so positioned (FIGS. 4 and 5), rail members 52, 54 in combination with the forward securement section 48 and/or the tabs 64, 66 releasably secure sliding securement member 16 to first top wall section 19, and also allow sliding securement member 16 to travel along the first top wall section 19, with portions of the extensions 56, 58 moving or sliding underneath rail members 52, 54.

When the sliding securement member 16 is releasably attached to the first top wall section 19, the tabs 64, 66 and/or the forward securement section 48 can limit the movement of the sliding securement member 16. For example, the sliding securement member 16 can slide or move in a rearward direction (e.g., away from the front wall 26 and toward second end 24) until the forward securement section 48 engages or abuts the rail members 52, 54, which prevents the sliding securement member 16 from being moved further in the rearward direction (FIG. 4).

Likewise, the sliding securement member 16 can slide or move in the forward direction (e.g., towards the front wall 26 and toward first end 22) until the tabs 64, 66 engage or abut the rail members 52, 54, which prevents the sliding securement member 16 from being moved further in the forward direction. To remove the sliding securement member 16 from housing 14, the operator can urge, deflect, depress, or compress the tabs 64, 66 inward and the sliding securement member 16 can be slid or moved in a forward direction toward first end 22 so that the deflected, depressed, or compressed tabs 64, 66 slide under and past the rail members 52, 54.

Referring back to FIGS. 1-8, first rear side wall 28 of housing 14 typically includes a groove 68, and second rear side wall 30 typically includes a groove 70 similar to groove 68 (FIG. 5). Grooves 68, 70 typically extend along walls 28, 30 from top wall section 19 to bottom side 11 of housing 14, although the present disclosure is not limited thereto.

Figure 8:
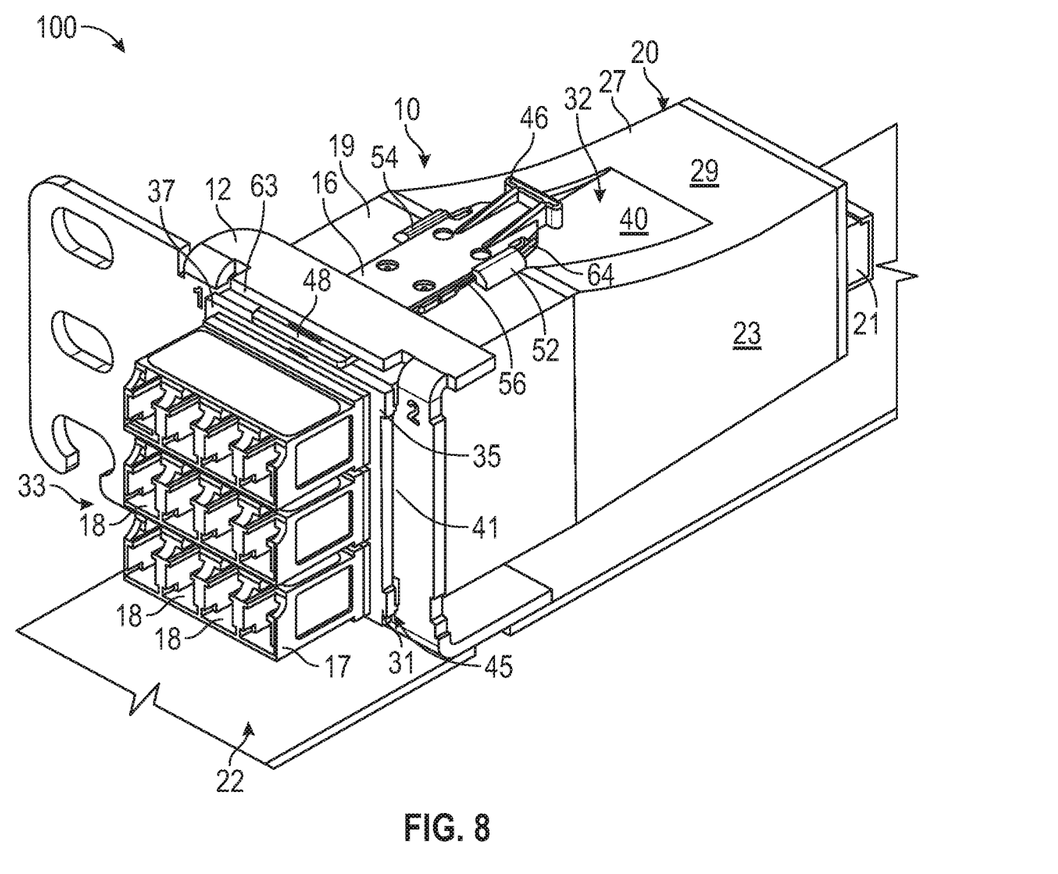
FIG. 8 is a side perspective view of the assembly and partial panel member of FIG. 1, with the sliding securement member in a forward position.

In exemplary embodiments, front wall 26 includes lower extensions 31, 33 and upper extensions 35, 37 extending from front wall 26 (extension 33 of FIGS. 2 and 8 is similar to extension 31, and is positioned proximal second rear side wall 30).

As noted above and as shown in FIGS. 1 and 9, exemplary panel member 12 of system 100 has a front panel surface/segment 15 that includes a plurality of apertures 13 therethrough. In general, each aperture 13 is typically configured and dimensioned to have a connector assembly 10 mounted with respect thereto.

In exemplary embodiments and as shown in FIGS. 1 and 8, each aperture 13 of panel member 12 includes two side flanges 41, 43 and two bottom flanges 45, 47. Exemplary side flanges 41, 43 and bottom flanges 45, 47 are configured and dimensioned to allow at least a portion of housing 14 to be inserted or positioned within aperture 13 when releasably secured sliding securement member 16 is moved to a rearward position away from the front wall 26 (as shown in FIG. 2). In other words, when sliding securement member 16 is moved to a rearward position away from the front wall 26 (FIG. 4), at least a portion of housing 14 may be inserted or positioned within aperture 13.

More specifically, when top wall section 19 of housing 14 is positioned proximal the top wall 63 of aperture 13, side flanges 41, 43 and bottom flanges 45, 47 are configured and dimensioned to allow the upper extensions 35, 37 and lower extensions 31, 33 of housing 14 to bypass the respective side flanges 41, 43 and bottom flanges 45, 47 of aperture 13 when sliding securement member 16 is moved to a rearward position away from the front wall 26 as housing 14 is inserted or positioned (e.g., advanced forward toward first end 22 with respect to FIG. 1) within aperture 13.

Once housing 14 has been moved to this above-noted position with the top wall section 19 near the top wall 63 and with the upper extensions 35, 37 positioned forwardly (toward end 22) in front of and above the side flanges 41, 43 and with the lower extensions 31, 33 positioned forwardly in front of and above the bottom flanges 45, 47, the side flange 41 is thereby positioned in groove 68 and side flange 43 is thereby positioned in groove 70.

As such, housing 14 may then be moved or slid downwardly to the position shown in FIG. 8, with side flange 41 moving or sliding in groove 68 and side flange 43 moving or sliding in groove 70, until the housing 14 is moved to a position where at least a portion of lower extension 31 is directly distally in front of and/or in locking engagement with bottom flange 45 and at least a portion of lower extension 33 is directly distally in front of and/or in locking engagement with bottom flange 47, and where at least a portion of upper extension 35 is directly distally in front of and/or in locking engagement with at least a portion of side flange 41 and at least a portion of upper extension 37 is directly distally in front of and/or in locking engagement with at least a portion of side flange 43 (alternatively, upper extensions 35, 37 need not be distally in front of and/or in locking engagement with side flanges 41, 43 when the housing 14 is in such a position).

After the housing 14 has moved to this position with respect to aperture 13, the sliding securement member 16 may then be advanced forward or distally (e.g., toward first end 22), from the position shown in FIG. 4, and then towards the panel member 12 until the forward securement section 48 lockingly engages the panel member 12 (e.g., top wall 63) and/or housing 14 to releasably lock or secure the housing 14 within or with respect to the panel member 12, as best shown in FIG. 8.

In exemplary embodiments, forward securement section 48 includes extending tab member 50 that is configured and dimensioned to engage to top wall 63 of panel member 12 when the sliding securement member 16 has been distally advanced to secure the housing 14 within or with respect to the panel member 12 (FIGS. 1, 5 and 8). Such engagement of the tab member 50 with top wall 63 further locks/secures housing 14 within or with respect to the panel member 12, and prevents sliding securement member 16 from being easily disengaged from panel member 12 and/or housing 14.

When the tab member 50 engages top wall 63 (FIG. 8), it is noted that the tab member 50 is configured to take up tolerance against top wall 63 panel member 12 to releasably lock the housing 14 and/or connector assembly 10 to the panel member 12.

In general, after distally advancing the sliding securement member 16 to secure the housing 14, the engaged forward securement section 48 prevents the side flanges 41, 43 from moving in the grooves 68, 70, and also prevent the housing 14 from being removed (e.g., distally or proximally) from the panel member 12. Moreover, the proximal edges of grooves 68, 70 may also prevent housing 14 from being removed (e.g., distally) from the panel member 12 (e.g., via engagement with side flanges 41, 43). Also, the lower extensions 31, 33 engaged with bottom flanges 45, 47 and the upper extensions 35, 37 engaged with side flanges 41, 43 prevent the housing 14 from being removed (e.g., distally or proximally) from the panel member 12.

To release or unlock housing 14 from aperture 13, first the sliding securement member 16 is moved or slid rearwardly or proximally toward second end 24 and to the position as shown in FIG. 4. The housing 14 may then be moved upwardly (with the side flanges 41, 43 traveling in grooves 68, 70) so that the lower extensions 31, 33 are above the bottom flanges 45, 47 and the upper extensions 35, 37 are above the side flanges 41, 43 so that the housing 14 may then be moved proximally or rearwardly out of engagement with and away from the panel member 12.

As noted, exemplary sliding securement member 16 is an elongated member extending from a first end 42 to a second end 44. By having at least a portion of second end 44 extend over and/or above recess 32 (e.g., at least a portion of second end 44 extends over and/or above recess 32 either in the extreme forward position of FIG. 6, or the extreme rearward position of FIG. 4, and various positions in-between), this enables an operator or technician to quickly and easily access, handle, grab and/or move the sliding securement member 16 in either direction (e.g., proximally or distally).

Therefore, this advantageously allows an operator or technician to quickly and easily secure/attach or unsecure/unattach the housing 14 from the panel member 12, even when under difficult conditions (e.g., in the field; when the housing 14 is located in a tight and/or limited workspace; and/or when it is next to and/or adjacent to multiple adjacent jack assemblies/housings, media, connectors/plug combinations, etc.).

Although the systems and methods of the present disclosure have been described with reference to exemplary embodiments thereof, the present disclosure is not limited to such exemplary embodiments and/or implementations. Rather, the systems and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

The invention claimed is:

1. A fiber optic connector assembly comprising:
a housing that extends from a first end to a second end, the housing including a front wall proximal to the first end and a first top wall section that extends from a position proximal to the front wall of the housing to a second top wall section, the second top wall section including a recess;
a sliding securement member releasably secured to the first top wall section of the housing, the sliding securement member extending from a first end to a second end;
wherein the second top wall section extends from the first top wall section to the second end of the housing, the second top wall section sloping downward from a position proximal to the first top wall section to the second end of the housing;
wherein the sliding securement member is configured to be moved away from the front wall of the housing to a rearward position to allow the housing to be moved to a first position within an aperture of a panel member;
wherein the sliding securement member is configured to be moved toward the front wall of the housing to a forward position to removably lock the housing within the aperture after the housing has moved to a second position within the aperture; and
wherein at least a portion of the second end of the sliding securement member is positioned over and above the recess of the second top wall section when the sliding securement member is in the rearward or the forward positions.

2. The assembly of claim 1, wherein the first end of the housing houses at least a portion of one or more fiber optic ports for mating with fiber optic connectors.

3. The assembly of claim 1, wherein the first end of the housing houses at least a portion of a first connector member and houses at least a portion of a second connector member, the first and second connector members each including one or more fiber optic ports for mating with fiber optic connectors; and wherein the second connector member is stacked above the first connector member so that the second connector member is positioned closer to the first top wall section of the housing than the first connector member.

4. The assembly of claim 3, wherein the first and second connector members each include four fiber optic ports for mating with fiber optic connectors.

5. The assembly of claim 3, wherein the first end of the housing houses at least a portion of a third connector member, the third connector member including one or more fiber optic ports for mating with fiber optic connectors; and wherein the third connector member is stacked above the second connector member so that the third connector member is positioned closer to the first top wall section of the housing than the second connector member.

6. The assembly of claim 1, wherein the recess is defined by an abutment wall, a first perimeter wall, a second perimeter wall, and a base wall; and wherein the abutment wall extends from a position proximal to the first top wall section downwards and away from the second top wall section.

7. The assembly of claim 6, wherein the base wall orthogonally extends from the abutment wall to a position along the second top wall section that is a distance away from the second end of the housing, and the first and second perimeter walls orthogonally extend from the abutment wall and from the base wall to define the recess.

8. The assembly of claim 1, wherein the housing further includes a first rear side wall and a second rear side wall, and the sliding securement member includes a forward securement section that extends from a first side to a second side; and wherein after the sliding securement member is releasably secured to the first top wall section of the housing, the first side of the forward securement section is positioned a distance away from the first rear side wall of the housing, and the second side of the forward securement section is positioned a distance away from the second rear side wall of the housing.

9. The assembly of claim 1, wherein the panel member is a patch panel member or a multi-connector panel member; and wherein the panel member is configured to be mounted with respect to a media patching system, and the media patching system is configured to be mounted with respect to a supporting structure.

10. The assembly of claim 1, wherein the first top wall section and the second top wall section are releasably secured to the housing; and wherein the housing includes a rear MPO plug.

11. The assembly of claim 1, wherein the sliding securement member includes a tab member; and wherein when the sliding securement member is moved toward the front wall to the forward position, the tab member takes up tolerance against a top wall of the panel member to removably lock the housing to the panel member.

12. The assembly of claim 1, wherein the recess is centrally positioned on the second top wall section, and the recess extends from a position proximal to the first top wall section to a position along the second top wall section that is a distance away from the second end of the housing.

13. The assembly of claim 1, wherein the first top wall section includes a first rail member and a second rail member, and the sliding securement member includes a first extension and a second extension; and wherein the sliding securement member is releasably secured to the first top wall section of the housing by: (i) inserting the first extension of the sliding securement member into the first rail member, and (ii) inserting the second extension of the sliding securement member into the second rail member.

14. The assembly of claim 1, wherein the front wall further includes a first extension that extends from the front wall and the panel member further includes a first flange, the first extension configured and dimensioned to bypass the first flange when the housing is moved to the first position; and wherein the first extension is lockingly engaged with the first flange when the housing is in the second position.

15. A fiber optic connector assembly comprising:
a housing that extends from a first end to a second end, the housing including a front wall proximal to the first end and a first top wall section that extends from a position proximal to the front wall of the housing to a second top wall section, the second top wall section including a recess;

a sliding securement member releasably secured to the first top wall section of the housing, the sliding securement member extending from a first end to a second end;

wherein the first end of the housing houses at least a portion of a first connector member and houses at least a portion of a second connector member, the first and second connector members each including two or more fiber optic ports for mating with fiber optic connectors;

wherein the second connector member is stacked above the first connector member so that the second connector member is positioned closer to the first top wall section of the housing than the first connector member;

wherein the sliding securement member is configured to be moved away from the front wall of the housing to a rearward position to allow the housing to be moved to a first position within an aperture of a panel member;

wherein the sliding securement member is configured to be moved toward the front wall of the housing to a forward position to removably lock the housing within the aperture after the housing has moved to a second position within the aperture; and wherein at least a portion of the second end of the sliding securement member is positioned over and above the recess of the second top wall section when the sliding securement member is in the rearward position.

16. The assembly of claim 15, wherein the first end of the housing houses at least a portion of a third connector member, the third connector member including two or more fiber optic ports for mating with fiber optic connectors; and wherein the third connector member is stacked above the second connector member so that the third connector member is positioned closer to the first top wall section of the housing than the second connector member.

17. The assembly of claim 16, wherein the first connector member is a LC quad connector member that is positioned proximal to a bottom side of the housing; wherein the second connector member is a LC quad connector member; and wherein the third connector member is a LC quad connector member that is positioned proximal to the first top wall section of the housing, with the second connector member positioned between the first and third connector members.

18. A fiber optic connector assembly comprising:

a housing that extends from a first end to a second end, the housing including a front wall proximal to the first end and a first top wall section that extends from a position proximal to the front wall of the housing to a second top wall section, the second top wall section including a recess;

a sliding securement member releasably secured to the first top wall section of the housing, the sliding securement member extending from a first end to a second end;

wherein the first end of the housing houses at least a portion of a first connector member and houses at least a portion of a second connector member and houses at least a portion of a third connector member, the first, second and third connector members each including two or more fiber optic ports for mating with fiber optic connectors;

wherein the second connector member is stacked above the first connector member so that the second connector member is positioned closer to the first top wall section of the housing than the first connector member;

wherein the third connector member is stacked above the second connector member so that the third connector member is positioned closer to the first top wall section of the housing than the second connector member, with the second connector member positioned between the first and third connector members;

wherein the second top wall section extends from the first top wall section to the second end of the housing, the second top wall section sloping downward from a position proximal to the first top wall section to the second end of the housing;

wherein the recess is defined by an abutment wall, a first perimeter wall, a second perimeter wall, and a base wall;

wherein the sliding securement member is configured to be moved away from the front wall of the housing to a rearward position to allow the housing to be moved to a first position within an aperture of a panel member;

wherein the sliding securement member is configured to be moved toward the front wall of the housing to a forward position to removably lock the housing within the aperture after the housing has moved to a second position within the aperture; and wherein at least a portion of the second end of the sliding securement member is positioned over and above the recess of the second top wall section when the sliding securement member is in the rearward or the forward positions.

\* \* \* \* \*